United States Patent
Singh et al.

(10) Patent No.: US 8,459,135 B2
(45) Date of Patent: Jun. 11, 2013

(54) SEVEN SPEED DUAL CLUTCH TRANSMISSION HAVING IMPROVED PACKAGING

(75) Inventors: Tejinder Singh, Canton, MI (US); Patrick S. Portell, Plymouth, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 761 days.

(21) Appl. No.: 12/711,063

(22) Filed: Feb. 23, 2010

(65) Prior Publication Data

US 2011/0030506 A1    Feb. 10, 2011

Related U.S. Application Data

(60) Provisional application No. 61/231,853, filed on Aug. 6, 2009.

(51) Int. Cl.
   *F16H 3/08*    (2006.01)

(52) U.S. Cl.
   USPC ............................................. 74/331; 74/330

(58) Field of Classification Search
   USPC ........................... 74/330, 331, 335, 339, 340
   See application file for complete search history.

(56) References Cited

U.S. PATENT DOCUMENTS

| | | | |
|---|---|---|---|
| 7,225,696 B2 | 6/2007 | Gitt | |
| 7,240,578 B2 | 7/2007 | Ogami et al. | |
| 7,340,973 B2 | 3/2008 | Hiraiwa | |
| 7,367,919 B2 | 5/2008 | Fähland et al. | |
| 7,409,886 B2 | 8/2008 | Gitt | |
| 7,743,677 B2 * | 6/2010 | Borgerson et al. | 74/331 |
| 7,845,247 B2 * | 12/2010 | Olds et al. | 74/333 |
| 7,870,804 B2 * | 1/2011 | Bjorck et al. | 74/331 |
| 8,307,729 B2 * | 11/2012 | Chazotte | 74/331 |
| 8,342,048 B2 * | 1/2013 | Rieger | 74/330 |
| 2005/0115345 A1 | 6/2005 | Gumpoltsberger et al. | |
| 2005/0193848 A1 | 9/2005 | Gitt | |
| 2006/0117882 A1 | 6/2006 | Gitt | |
| 2006/0219033 A1 | 10/2006 | Gitt | |
| 2007/0022835 A1 | 2/2007 | Kilian et al. | |
| 2007/0214906 A1 | 9/2007 | Fahland et al. | |
| 2007/0240530 A1 | 10/2007 | Ogami et al. | |
| 2007/0289399 A1 | 12/2007 | Tanba et al. | |
| 2008/0034905 A1 | 2/2008 | Hatori et al. | |
| 2008/0047378 A1 | 2/2008 | Borgerson et al. | |
| 2008/0047379 A1 | 2/2008 | Borgerson et al. | |

(Continued)

FOREIGN PATENT DOCUMENTS

| | | |
|---|---|---|
| DE | 102006016059 A1 | 10/2007 |
| DE | 102006016397 A1 | 10/2007 |

(Continued)

*Primary Examiner* — Troy Chambers
*Assistant Examiner* — Michael Gonzalez

(57) ABSTRACT

A transmission connected to an engine input member and having an output transfer gear, first and second transmission input shaft members, first and second countershaft members, a plurality of co-planar gear sets, and a plurality of torque transmitting devices. The first and second transmission input shaft members are rotatably supported in the transmission housing by a combination of ball and needle bearings. The first and second countershaft members are rotatably supported in the transmission housing by plurality of thrust bearings. The torque transmitting devices include a plurality of synchronizer assemblies and a dual clutch assembly. The transmission is operable to provide at least one reverse speed ratio and a plurality of forward speed ratios between the input member and the output member.

23 Claims, 2 Drawing Sheets

U.S. PATENT DOCUMENTS

| | | |
|---|---|---|
| 2008/0134818 A1 | 6/2008 | Gitt |
| 2008/0134820 A1 | 6/2008 | Bjorck et al. |
| 2008/0141808 A1 | 6/2008 | Gumpoltsberger |
| 2008/0196526 A1 | 8/2008 | Singh et al. |
| 2008/0202265 A1 | 8/2008 | Hendrickson et al. |
| 2008/0202266 A1 | 8/2008 | Hendrickson et al. |
| 2008/0202267 A1 | 8/2008 | Hendrickson et al. |
| 2008/0202268 A1 | 8/2008 | Carey et al. |
| 2010/0206105 A1* | 8/2010 | Rieger ............... 74/331 |
| 2011/0138943 A1* | 6/2011 | Mohlin et al. ......... 74/331 |

FOREIGN PATENT DOCUMENTS

| | | |
|---|---|---|
| WO | WO2005093289 A1 | 10/2005 |
| WO | WO2006106534 A1 | 10/2006 |
| WO | WO2006128626 A1 | 12/2006 |

* cited by examiner

SEVEN SPEED DUAL CLUTCH TRANSMISSION HAVING IMPROVED PACKAGING

CROSS-REFERENCE TO RELATED APPLICATIONS

This application claims the benefit of U.S. Provisional Application No. 61/231,853, filed on Aug. 6, 2009, which is hereby incorporated in its entirety herein by reference.

TECHNICAL FIELD

The present disclosure relates to transmissions and more particularly to a compact, dual clutch multiple speed transmission having three axes to establish seven or more gear speeds.

BACKGROUND

The statements in this section merely provide background information related to the present disclosure and may or may not constitute prior art.

A typical multiple speed transmission having countershafts and co-planar gear sets uses countershaft gears with a different, dedicated gear pair or set to achieve each forward speed ratio. Accordingly, the total number of gears required in this typical design is two times the number of forward speeds, plus three for reverse. This necessitates a large number of required gear pairs, especially in transmissions that have a relatively large number of forward speed ratios.

While current transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need in the art for a transmission having improved packaging while providing desirable gear ratios and torque ranges.

SUMMARY

The present invention provides a transmission having an input member, an output member, first and second shaft members, first and second countershaft members, a plurality of co-planar gear sets, and a plurality of torque transmitting devices. The torque transmitting devices include a plurality of synchronizer assemblies and a dual clutch assembly. The transmission is operable to provide at least one reverse speed ratio and a plurality of forward speed ratios between the input member and the output member.

In one aspect of the present invention, the transmission includes six co-planar gear sets.

In another aspect of the present invention, two of the six co-planar gear sets are configured to produce two gear ratios each and two other of the six co-planar gear sets are configured to produce one gear ratio each.

In yet another aspect of the present invention, the transmission includes four synchronizer assemblies driven by four rail and fork assemblies.

In yet another aspect of the present invention, the four synchronizer assemblies include four two-way synchronizers.

In yet another aspect of the present invention, the transmission is operable to provide at least seven forward speed ratios.

In yet another aspect of the present invention, the transmission includes a transmission housing, a dual clutch assembly, first, second, third, fourth, and fifth gear sets, a first transmission input member, a second transmission input member, a first countershaft, a second countershaft and four synchronizer assemblies.

In still another aspect of the present invention, the dual clutch assembly has a clutch housing connectable to a flywheel of an engine. The clutch housing is rotationally supported within the transmission housing by a first ball bearing assembly.

In still another aspect of the present invention, the first gear set includes a first gear in mesh with a first portion of second gear and a third gear in mesh with a second portion of the second gear. The second gear set includes a first gear in mesh with a second gear and a third gear. The third gear set includes a first gear in mesh with a second gear and a third gear. The fourth gear set includes a first gear in mesh with a second gear. The fifth gear set includes a first gear in mesh with a second gear.

In still another aspect of the present invention, the first transmission input member has a first end portion rotatably supported in the transmission housing by a second ball bearing assembly and a second end portion by a first needle bearing assembly.

In still another aspect of the present invention, the first needle bearing assembly is disposed adjacent a second end wall of the transmission housing proximate to the dual clutch assembly.

In still another aspect of the present invention, each of the first gear of the third, fourth and fifth gear set are rotatably fixed for common rotation with the first transmission input member.

In still another aspect of the present invention, the second ball bearing assembly is adjacent a first end wall of the transmission housing.

In still another aspect of the present invention, the second transmission input member has a first end portion rotatably supported in the transmission housing by a second needle bearing assembly and a second end portion by a third ball bearing assembly.

In still another aspect of the present invention, the second needle bearing assembly is disposed between the second ball bearing assembly and the third ball bearing assembly.

In still another aspect of the present invention, the third ball bearing assembly is axially aligned and concentric with the first needle bearing assembly.

In still another aspect of the present invention, each of the first gear of the first and second gear sets are rotatably fixed for common rotation with the second transmission input member.

In still another aspect of the present invention, the second transmission input member is concentric with the first transmission input member and at least partially surrounds the first transmission input member.

In still another aspect of the present invention, the first countershaft rotatably supported within the transmission housing by a first and second set of thrust bearings and spaced apart from and parallel with the first and second transmission input member.

In still another aspect of the present invention, the third gear of the first gear set, the third gear of the second gear set, the third gear of the third gear set and the second gear of the fourth gear set are each selectively connectable for common rotation with the first countershaft.

In still another aspect of the present invention, the second countershaft is rotatably supported within the transmission housing by a third and fourth set of thrust bearings and spaced apart from and parallel with the first and second transmission input members. The second gear of the first gear set and the second gear of the second gear set are each selectively connectable for common rotation with the second countershaft.

In still another aspect of the present invention, the four synchronizer assemblies selectively couple at least one of the gears of the first, second, third, fourth and fifth gear sets with at least one of the first transmission input member, the second transmission input member, the first countershaft and the second countershaft. The selective engagement of dual clutch assembly interconnects the dual clutch housing with at least one of the first member and the second transmission input member and the selective engagement of at least one of the four synchronizer assemblies establishes at least one of seven forward speed ratios.

The above features and advantages and other features and advantages of the present invention are readily apparent from the following detailed description of the best modes for carrying out the invention when taken in connection with the accompanying drawings.

DESCRIPTION

Figure 1A:
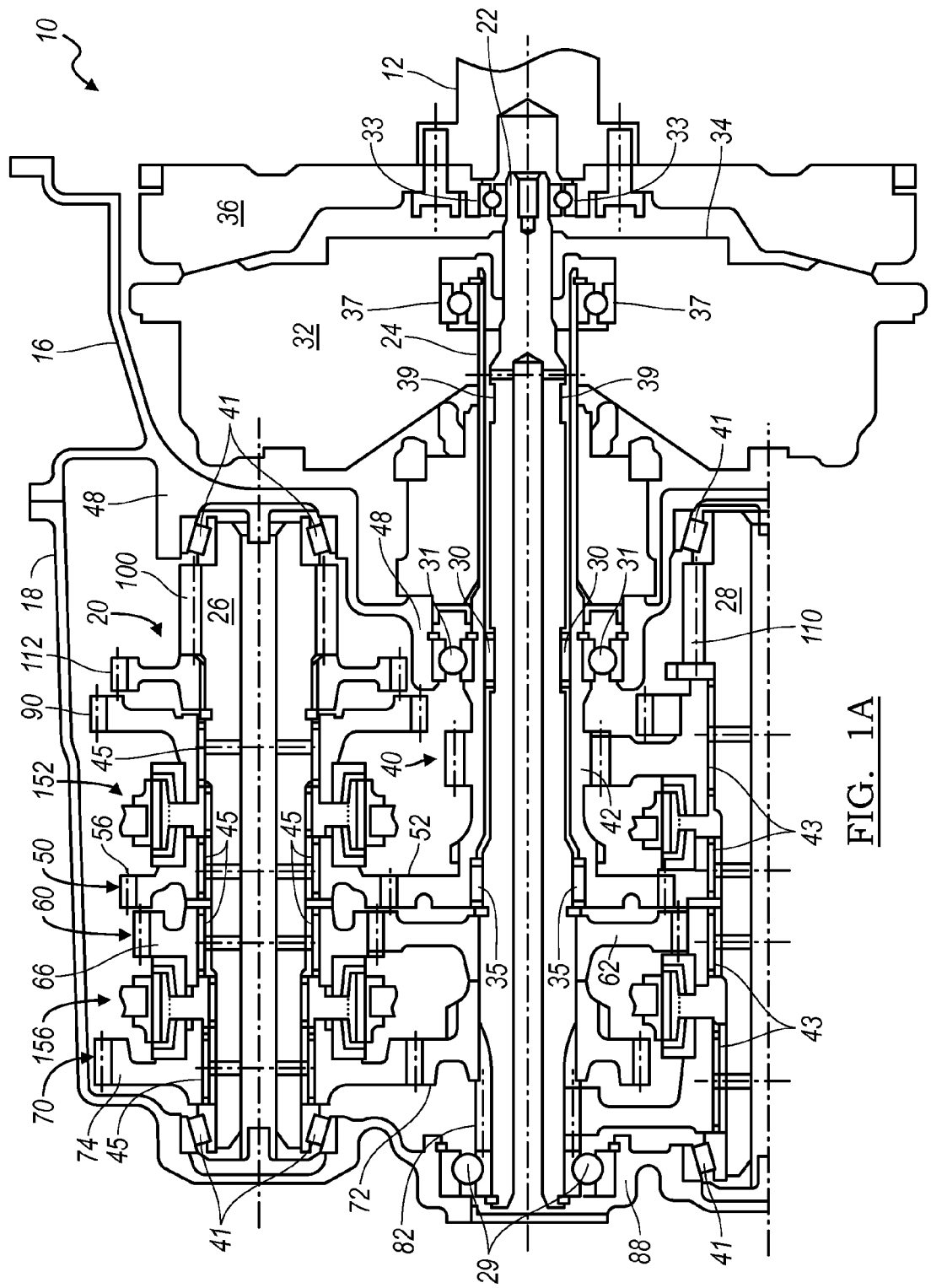
FIG. 1 is a cross-sectional view of a seven speed dual-clutch transmission, in accordance with an embodiment of the present invention.
Figure 1B:
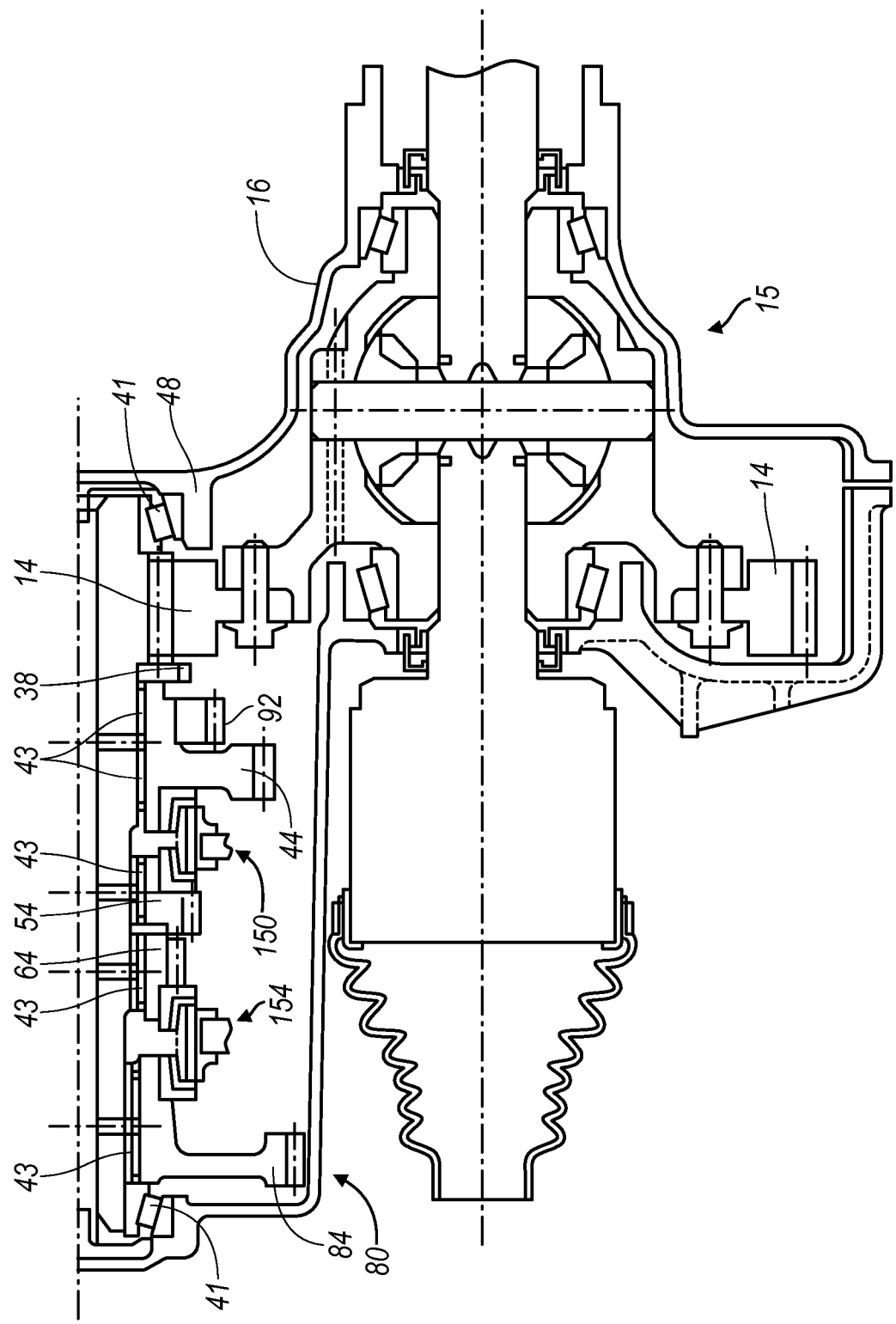

Referring to FIG. 1, a multiple speed transmission is generally indicated by reference number 10. The transmission 10 is coupled to an engine input member 12 and includes an output member or gear 14. In the present embodiment, the engine input member 12 is an engine crankshaft and the output member 14 is a gear, however those skilled in the art will appreciate that the input member 12 may be components other than shaft and the output member 14 may be a component, such as a shaft, other than a gear.

The engine input member 12 is continuously connected with an engine (not shown) or other torque producing machine to provide a driving torque to input member 12. The output member or gear 14 rotatably drives a differential assembly 15 disposed in a housing 16. The differential assembly 15 transfers torque delivered by output member 14, ultimately, to a pair road wheels (not shown).

The transmission 10 also includes a housing 18 that at least partially encloses a gearing arrangement 20. The gearing arrangement 20 includes various shafts or members, co-planar intermeshing gear sets, a dual clutch assembly, and selectively engageable synchronizers, as will be described herein. For example, the gearing arrangement 20 includes a first transmission input shaft or member 22, a second shaft or member 24, a first countershaft 26, and a second countershaft 28. The second transmission input shaft or member 24 is a sleeve (hollow) shaft that is concentric with and overlies the first transmission input shaft or member 22. The first countershaft 26 and the second countershaft 28 are each spaced apart from and parallel with the first and second transmission input shaft members 22, 24. The first and second shafts 22, 24 define a first axis of rotation, the first countershaft 26 defines a second axis of rotation and the second countershaft 28 defines a third axis of rotation.

First transmission input shaft 22 is supported in housing 18 by a plurality of bearings. The plurality of bearings that provide rotational support for first shaft 22 include a pair of ball bearings 29 and a plurality of needle bearings 30. Ball bearings 29 are capable of limiting radial and axial movement of shaft 22 and are positioned adjacent an end wall 88 of transmission housing 18. Needle bearings 30 are capable of limiting radial movement of the shaft in a direction transverse to shaft 22. Moreover, the load in shaft 22 is transmitted through needle bearings 30 and through second shaft 24 to a second set of ball bearings 31. Accordingly, needle bearings 30 are axially aligned with the second set of ball bearings 31 for optimal load transfer. Second set of ball bearings 31 are attached to and transmit the load in both the first and second shafts 22 and 24 to a wall 48 of the transmission housing 16. A third set of ball bearing 33 are disposed adjacent input member 12 and function to axially align first shaft 22 with input member 12. Third set of ball bearing 33 are configured to limit radial movement of first shaft 22.

Second shaft 24 is also supported in housings 18 and 16 by a plurality of bearings. The plurality of bearings that provide rotational support for second shaft 24 include a first plurality of needle bearings 35 second set of ball bearings 31 and a fourth set of ball bearings 37. Needle bearings 35 are capable of limiting radial movement of the shaft in a direction transverse to shaft 24. Needle bearings 35 are axially aligned along first shaft 22 with co-planar gear set 50. Ball bearings 31 and 37 are capable of limiting radial and axial movement of shaft 24 and are positioned in housing 16.

The first and second countershafts 26 and 28 are rotationally supported in transmission housing 18 by a plurality of thrust or tapered roller bearings 41. Thrust bearings 41 are disposed at both ends of each of the first and second countershafts 26, 28, as shown in FIG. 1. The thrust bearings 41 are capable of limiting radial and axial movement of the first and second countershafts 26 and 28.

The dual clutch assembly 32 is connected between the input member 12 and the first and second shaft members 22, 24. The dual clutch assembly 32 includes a clutch housing 34 connected for common rotation with a flywheel 36. Flywheel 36 is fixedly coupled to the input member 12 for common rotation therewith. Clutch housing 34 together with the flywheel 36 and input member/shaft 12 transfer driving torque from an engine (not shown) to the gear sets of transmission 10. Further, the dual clutch assembly 32, as known in the art has first and second clutch elements or hubs (not shown). The clutch elements together with the clutch housing 34 are configured to form a friction clutch, as is known in the art as a dual clutch. More specifically, clutch elements and the clutch housing 34 have friction plates (not shown) mounted thereon or otherwise coupled thereto that interact to form a friction clutch. For example one of the clutch elements is connected for common rotation with the first shaft or member 22 and the other clutch element is connected for common rotation with the second shaft or member 24. Thus, selective engagement of one of the clutch elements with the clutch housing 34 connects the input member 12 for common rotation with the first shaft member 22. Selective engagement of the other clutch element with the clutch housing 34 connects the input member 12 for common rotation with the second shaft member 24.

The gearing arrangement 20 also includes a plurality of co-planar, meshing gear sets 40, 50, 60, 70 and 80. Advantageously, gearing arrangement 20 provides a reduced axial length "L" of the transmission 10. As will be described below, the axial length "L" of the transmission 10 is reduced, for example, by the relative positioning of the individual gears of the gear sets and other components on the countershafts. More specifically, for example, a tone wheel 38 for providing a target for a speed sensor (not shown) for determining the rotational speed of the second countershaft 28 is fixedly attached to countershaft 28. Tone wheel 38 is disposed on second countershaft 28 such that the tone wheel 38 is axially aligned with the ball bearings 31. This axial alignment or nesting over the ball bearings 31 of tone wheel 38 minimizes the axial length "L" of the transmission 10.

Co-planar gear set 40 includes gear 42 and gear 44. Gear 42 is rotatably fixed and connected for common rotation with the second shaft member 24. Gear 44 is selectively connectable for common rotation with the second countershaft member 28 and meshes with gear 42. When gear 44 is not connected with the second countershaft member 28, gear 44 is supported for free rotation about second countershaft member 28 by a plurality of cage and roller bearings 43. It should be appreciated that gear 42 may be a separate gear structure fixed to the second shaft member 24 or gear teeth/splines formed on an outer surface of the second shaft member 24 without departing from the scope of the present invention. Gear set 40 is disposed proximate a wall 48 of the transmission housing 16 that is on a front or side of the transmission 10 proximate the dual clutch assembly 32.

Co-planar gear set 50 includes gear 52, gear 54 and gear 56. Gear 52 is rotatably fixed and connected for common rotation with the second shaft member 24 and meshes with gear 54 and gear 56. Gear 54 is selectively connectable for common rotation with the second countershaft member 28. When gear 54 is not connected with the second countershaft member 28, gear 54 is supported for free rotation about second countershaft member 28 by a plurality of cage and roller bearings 43. Gear 56 is selectively connectable for common rotation with the first countershaft member 26. Gear set 50 is positioned adjacent gear set 40 on the opposite side of gear set 40 than the side of gear set 40 that is opposing dual clutch 32.

Co-planar gear set 60 includes gear 62, gear 64 and gear 66. Gear 62 is rotatably fixed and connected for common rotation with the first shaft member 22 and meshes with gear 64 and gear 66. Gear 64 is selectively connectable for common rotation with the second countershaft member 28. When gear 64 is not connected with the second countershaft member 28, gear 64 is supported for free rotation about second countershaft member 28 by a plurality of cage and roller bearings 43. Gear 66 is selectively connectable for common rotation with the first countershaft member 26. When gear 66 is not connected with the first countershaft member 26, gear 66 is supported for free rotation about first countershaft member 26 by a plurality of cage and roller bearings 45. Gear set 60 is disposed adjacent gear set 50 on the opposite side of gear set 50 than the side of gear set 50 that is opposing gear set 40.

Co-planar gear set 70 includes gear 72 and gear 74. Gear 72 is rotatably fixed and connected for common rotation with the first shaft member 22 and meshes with gear 74. Gear 74 is selectively connectable for common rotation with the first countershaft member 26. When gear 74 is not connected with the first countershaft member 26, gear 74 is supported for free rotation about first countershaft member 26 by a plurality of cage and roller bearings 45. Gear set 70 is positioned adjacent gear set 60 on the opposite side of gear set 60 than the side of gear set 60 that is opposing gear set 50.

Co-planar gear set 80 includes gear 82 and gear 84. Gear 82 is rotatably fixed and connected for common rotation with the first shaft member 22 and meshes with gear 84. Gear 84 is selectively connectable for common rotation with the second countershaft member 28. When gear 84 is not connected with the second countershaft member 28, gear 84 is supported for free rotation about second countershaft member 28 by a plurality of cage and roller bearings 43. Gear set 80 is positioned between gear set 70 and an end wall 88 of the transmission housing 18.

Reverse gear 90 is selectively connectable for common rotation with the first countershaft member 26 and meshes with a reverse gear portion 92 of stepped gear 44. When reverse gear 90 is not connected with the first countershaft member 26, reverse gear 90 is supported for free rotation about first countershaft member 26 by a plurality of cage and roller bearings 45. Reverse gear portion 92 of gear 44 is fixed for common rotation with gear 44 and may have a different gear pitch than the gear pitch of gear 44, as required, to implement a reverse gear speed. Reverse gear 90 is located between gear set 50 and end wall 48.

Further, a first countershaft transfer gear 100 is rotatably fixed and connected for common rotation with the first countershaft member 26. A second countershaft transfer gear 110 is rotatably fixed and connected for common rotation with the second countershaft member 28. First countershaft transfer gear 100 is configured to mesh with output member 14 and the second countershaft transfer gear 110 is configured to mesh with output member 14. However, the first countershaft transfer gear 100 and the second countershaft transfer gear 110 do not mesh with each other. The first countershaft transfer gear 100 is disposed between the reverse gear 90 and end wall 48 of the transmission housing 18. The second countershaft transfer gear 110 is disposed between gear 44 and end wall 48 of the transmission housing 18. The output member 14 is co-planar with first and second countershaft transfer gears 100, 110.

A park gear 112 is provided for placing transmission 10 in a park mode that prevents output member 14 from rotating. Park brake gear 112 is coupled to first countershaft member 26 for common rotation therewith. Alternatively, the present invention contemplates fixedly disposing park brake gear on the second countershaft 28 to achieve the park mode function. Park brake gear 112 is disposed on first countershaft 26 such that the park brake gear 112 is axially aligned with the ball bearings 31. This axial alignment or nesting over the ball bearings 31 of gear 112 minimizes the axial length "L" of the transmission 10.

The transmission 10 further includes a plurality of selectively engageable synchronizer assemblies 150, 152, 154 and 156. Synchronizers 150, 152, 154 and 156 are double sided synchronizers and generally include a shift fork (not shown) that is bi-directionally translated by an actuator (not shown) into at least two engaged positions and a neutral or disengaged position. In the present embodiment, synchronizer 150 is selectively actuatable to connect gear 44 for common rotation with the second countershaft member 28 and synchronizer 150 is selectively actuatable to connect gear 54 for common rotation with the second countershaft member 28. Synchronizer 150 is fixed to the second countershaft 28 and is positioned between gears 44 and 54. Synchronizer 152 is selectively actuatable to connect for common rotation reverse gear 90 with the first countershaft 26 and is selectively actuatable to connect for common rotation gear 56 with the first countershaft 26. Synchronizer 152 is fixed to the first countershaft 26 and is positioned between gear 56 and reverse gear 90. Synchronizer 154 is selectively actuatable to connect for common rotation gear 64 with the second countershaft 28 and is selectively actuatable to connect for common rotation gear 84 with the second countershaft 28. Synchronizer 154 is fixed to the second countershaft 28 and is positioned between gears 64 and 84. Advantageously, gear 72 of gear set 70 is disposed on first shaft 22 such that gear 72 is axially aligned with at least a portion of synchronizer 154. This axial alignment or nesting over at least a portion of synchronizer 154 of gear 72 of gear set 70 minimizes the axial length "L" of the transmission 10. Synchronizer 156 is selectively actuatable to connect for common rotation gear 66 with the first countershaft member 26 and is selectively actuatable to connect for common rotation gear 74 with the first countershaft member 26. Synchronizer 156 is fixed to the first countershaft 26 and is positioned between gears 66 and 74. Advantageously, synchronizer 156 is disposed on first countershaft 26 such that the synchronizer 156 is axially aligned with at least a portion of gear 72 of gear set 70. This axial alignment or nesting over at least a portion of gear 72 of gear set 70 of synchronizer 156 minimizes the axial length "L" of the transmission 10.

The transmission 10 is capable of transmitting torque from the input shaft 12 to the output gear member 14 in at least seven forward torque ratios and at least one reverse torque ratio. Each of the forward torque ratios and the reverse torque ratio is attained by selective engagement of the dual clutch assembly 32 and one or more of the synchronizer assemblies 150, 152, 154 and 156. Those skilled in the art will readily understand that a different speed ratio is associated with each torque ratio.

It should be appreciated that each individual gear set 40, 50, 60, 70 and 80 provides one or more forward and/or reverse gear ratios upon selective engagement of the synchronizer assemblies 150, 152, 154 and 156. It should also be appreciated that a particular forward or reverse speed ratio may be achieved by different combinations of synchronizer and associated gear sets without departing from the scope of the present invention.

For example, to establish the reverse torque ratio, dual clutch element 32 is engaged and synchronizer 152 is activated. Dual clutch 32 couples the input member 12 with the second shaft member 24. Synchronizer 152 connects reverse gear 90 to the first countershaft member 26. More specifically, input torque from the input shaft 12 is transferred through the dual clutch assembly 32 to the second shaft member 24, through gear 42 to gear 44, through gears 44 and 92 to reverse gear 90, from gear 90 to the first countershaft member 26 through synchronizer 152 to first countershaft transfer gear 100 and from first countershaft transfer gear 100 to the output member 14.

To establish a first forward torque ratio (i.e. a 1st gear), dual clutch 32 is engaged and synchronizer 154 is activated. Dual clutch 32 couples the input member 12 with the first shaft member 22. Synchronizer 154 couples gear 84 to the second countershaft member 28. Input torque from the input member 12 is transferred through the dual clutch assembly 32 to the first shaft member 22 to gear 82. Gear 82 transfers torque to gear 84 which transfers the torque to the second countershaft member 28 through synchronizer 154 and to second countershaft transfer gear 110 and then from second countershaft transfer gear 110 to the output member 14.

To establish a second forward torque ratio (i.e. a 2nd gear), dual clutch 32 is engaged and synchronizer 150 is activated. Dual clutch 32 couples the input member 12 to the second shaft member 24 which rotates gear 42. Synchronizer 150 couples gear 44 to the second countershaft member 28. Accordingly, input torque from the input member 12 is transferred through the dual clutch assembly 32 to the second shaft member 24, through gear 42 to gear 44, from gear 44 to synchronizer 150, from synchronizer 150 to the second countershaft member 28 and from the second countershaft member 28 to the second countershaft transfer gear 110 and the output member 14.

To establish a third forward torque ratio (i.e. a 3rd gear), dual clutch 32 is engaged and synchronizer 156 is activated. Dual clutch 32 couples the input member 12 to the first shaft member 22 which rotates gear 72. Synchronizer 156 couples gear 74 to the first countershaft member 26. Thus, input torque from the input member 12 is transferred through the dual clutch assembly 32 to the first shaft member 22, through gear 72 to gear 74, through gear 74 to synchronizer 156, from synchronizer 156 to the first countershaft member 26, from the first countershaft member 26 to the first countershaft transfer gear 100 and then from first countershaft transfer gear 100 to the output member 14.

To establish a fourth forward torque ratio (i.e. a 4th gear), dual clutch 32 is engaged and synchronizer 152 is activated. Dual clutch 32 couples the input member 12 to the second shaft member 24 which rotates gear 52. Synchronizer 152 couples gear 56 to the first countershaft member 26. Thus, input torque from the input member 12 is transferred through the dual clutch assembly 32 to the second shaft member 24 to gear 52, then from gear 52 to gear 56, from gear 56 to synchronizer 152, from synchronizer 152 to the first countershaft member 26, from the first countershaft member 26 to first countershaft transfer gear 100 and then from first countershaft transfer gear 100 to the output member 14.

To establish a fifth forward torque ratio (i.e. a 5th gear), dual clutch 32 is engaged and synchronizer 156 is activated. Dual clutch 32 couples the input member 12 to the first shaft member 22 which rotates gear 62. Synchronizer 156 couples gear 66 to the first countershaft member 26. Input torque from the input member 12 is transferred through the dual clutch assembly 32 to the first shaft member 22, from first shaft member 22 to gear 62, from gear 62 to gear 66, from gear 66 to the first countershaft member 26 through synchronizer 156, to first countershaft transfer gear 100 and from first countershaft transfer gear 100 to the output member 14.

To establish a sixth forward torque ratio (i.e. a 6th gear), dual clutch 32 is engaged and synchronizer 150 is activated. Dual clutch 32 couples the input member 12 to the second shaft member 24 which rotates gear 52. Synchronizer 150 couples gear 54 to the second countershaft member 28. Thus, input torque from the input member 12 is transferred through the dual clutch assembly 32 to the second shaft member 24 to gear 52, then from gear 52 to gear 54, from gear 54 to synchronizer 150, from synchronizer 150 to the second countershaft member 28, from the second countershaft member 28 to second countershaft transfer gear 110 and then from second countershaft transfer gear 110 to the output member 14.

To establish a seventh forward torque ratio (i.e. a 7th gear), dual clutch 32 is engaged and synchronizer 154 is activated. Dual clutch 32 couples the input member 12 to the first shaft member 22 which rotates gear 62. Synchronizer 154 couples gear 64 to the second countershaft member 28. Input torque from the input member 12 is transferred through the dual clutch assembly 32 to the first shaft member 22, from first shaft member 22 to gear 62, from gear 62 to gear 64, from gear 64 to the second countershaft member 28 through synchronizer 154, to second countershaft transfer gear 110 and from second countershaft transfer gear 110 to the output member 14.

The present invention contemplates that a variety of torque ratios (i.e., the ratio of torque of the output member 14 to the input member 12) and ratio steps are achievable through the selection of tooth counts of the gears of the transmission 10. The present invention has many advantages and benefits over the prior art. For example, the utilization of four synchronizers allows the use of four rails having one fork on each rail. Thus, a transmission having a more simplified actuation and control system, reduced mass and cost and improved packaging is achieved.

While the best modes for carrying out the invention have been described in detail, those familiar with the art to which this invention relates will recognize various alternative designs and embodiments for practicing the invention within the scope of the appended claims.

The invention claimed is:

1. A transmission comprising:
   a transmission housing;
   a dual clutch assembly having a clutch housing connectable to a flywheel of an engine, wherein the clutch housing is rotationally supported within the transmission housing by a first ball bearing assembly;
   a first, second, third, fourth, and fifth gear set, wherein the first gear set includes a first gear in mesh with a second gear and a third gear in mesh with the second gear, the second gear set includes a first gear in mesh with a second gear and a third gear, the third gear set includes a first gear in mesh with a second gear and a third gear, the fourth gear set includes a first gear in mesh with a second gear, the fifth gear set includes a first gear in mesh with a second gear;
   a first transmission input member having a first end portion rotatably supported in the transmission housing by a second ball bearing assembly and a second end portion by a first needle bearing assembly, and wherein each of the first gear of the third, fourth and fifth gear set are rotatably fixed for common rotation with the first transmission input member;
   a second transmission input member having a first end portion rotatably supported in the transmission housing by a second needle bearing assembly and a second end portion by a third ball bearing assembly, wherein the third ball bearing assembly is axially aligned and concentric with the first needle bearing assembly, wherein each of the first gear of the first and second gear sets are rotatably fixed for common rotation with the second transmission input member and wherein the second transmission input member is concentric with the first transmission input member and at least partially surrounds the first transmission input member;
   a first countershaft rotatably supported within the transmission housing by a first and second set of thrust bearings and spaced apart from and parallel with the first and second transmission input members, wherein the third gear of the first gear set, the third gear of the second gear set, the third gear of the third gear set and the second gear of the fourth gear set are each selectively connectable for common rotation with the first countershaft;
   a second countershaft rotatably supported within the transmission housing by a third and fourth set of thrust bearings and spaced apart from and parallel with the first and second transmission input members, wherein the second gear of the first gear set and the second gear of the second gear set are each selectively connectable for common rotation with the second countershaft;
   four synchronizer assemblies for selectively coupling at least one of the gears of the first, second, third, fourth and fifth gear sets with at least one of the first transmission input member, the second transmission input member, the first countershaft and the second countershaft, and
   wherein the selective engagement of dual clutch assembly interconnects the dual clutch housing with at least one of the first and the second transmission input members and the selective engagement of at least one of the four synchronizer assemblies establishes at least one of seven forward speed ratios.

2. The transmission of claim 1 wherein the second ball bearing assembly is disposed adjacent a first end wall of the transmission housing.

3. The transmission of claim 1 wherein the first needle bearing assembly is disposed adjacent second end wall of the transmission housing proximate to the dual clutch assembly.

4. The transmission of claim 1 wherein a second needle bearing assembly is disposed between the second ball bearing assembly that is disposed adjacent the first end wall of the transmission housing and the third ball bearing assembly that is axially aligned and concentric with the first needle bearing assembly.

5. The transmission of claim 1 wherein the first set of thrust bearings is disposed at a first end of the first countershaft and the second set of thrust bearings is disposed at a second end of the first countershaft.

6. The transmission of claim 1 wherein the third set of thrust bearings is disposed at a first end of the second countershaft and the fourth set of thrust bearings is disposed at a second end of the second countershaft.

7. The transmission of claim 1 further comprising a tone wheel fixedly connected to the second countershaft and axially aligned with the third ball bearings assembly.

8. The transmission of claim 1 wherein a first of the four synchronizer assemblies selectively connects at least one of the second gear of the first gear set and the second gear of the second gear set to the second countershaft shaft.

9. The transmission of claim 8 wherein a second of the four synchronizer assemblies selectively connects at least one of the third gear of the first gear set and third gear of the second gear set to the first countershaft shaft.

10. The transmission of claim 9 wherein a third of the four synchronizer assemblies selectively connects at least one of the second gear of the third gear set and the second gear of the fifth gear set to the second countershaft shaft.

11. The transmission of claim 10 wherein a fourth of the four synchronizer assemblies selectively connects at least one of the third gear of the third gear set and the second gear of the fourth gear set to the first countershaft shaft.

12. The transmission of claim 1 wherein the first gear set is adjacent the dual clutch assembly, the second gear set is adjacent the first gear set, the third gear set is adjacent the second gear set, the fourth gear set is adjacent the third gear set, and the fifth gear set is adjacent the fourth gear set.

13. The transmission of claim 12 wherein the dual clutch assembly includes a first clutch and a second clutch, wherein the second clutch is configured to selectively connect the input member to the second interconnecting member and wherein the four synchronizer assemblies includes a first synchronizer assembly for selectively connecting the second gear of the first gear set to the second countershaft to establish a second gear ratio.

14. The transmission of claim 13 wherein the dual clutch assembly includes a first clutch and a second clutch, wherein the second clutch is configured to selectively connect the input member to the second interconnecting member and wherein the four synchronizer assemblies includes a first synchronizer assembly for selectively connecting the second gear of the second gear set to the second countershaft to establish a sixth gear ratio.

15. The transmission of claim 14 wherein the dual clutch assembly includes a first clutch and a second clutch, wherein the second clutch is configured to selectively connect the input member to the second interconnecting member and wherein the four synchronizer assemblies includes a second synchronizer assembly for selectively connecting the third gear of the first gear set to the first countershaft to establish a reverse gear ratio.

16. The transmission of claim 15 wherein the dual clutch assembly includes a first clutch and a second clutch, wherein the second clutch is configured to selectively connect the input member to the second interconnecting member and wherein the four synchronizer assemblies includes a second synchronizer assembly for selectively connecting the third gear of the second gear set to the first countershaft to establish a fourth gear ratio.

17. The transmission of claim 16 wherein the dual clutch assembly includes a first clutch and a second clutch, wherein the first clutch is configured to selectively connect the input member to the first interconnecting member and wherein the four synchronizer assemblies includes a third synchronizer assembly for selectively connecting the second gear of the third gear set to the second countershaft to establish a seventh gear ratio.

18. The transmission of claim 17 wherein the dual clutch assembly includes a first clutch and a second clutch, wherein the first clutch is configured to selectively connect the input member to the first interconnecting member and wherein the four synchronizer assemblies includes a third synchronizer assembly for selectively connecting the second gear of the fifth gear set to the second countershaft to establish a first gear ratio.

19. The transmission of claim 18 wherein the dual clutch assembly includes a first clutch and a second clutch, wherein the first clutch is configured to selectively connect the input member to the first interconnecting member and wherein the four synchronizer assemblies includes a fourth synchronizer assembly for selectively connecting the third gear of the third gear set to the first countershaft to establish a fifth gear ratio.

20. The transmission of claim 19 wherein the dual clutch assembly includes a first clutch and a second clutch, wherein the first clutch is configured to selectively connect the input member to the first interconnecting member and wherein the four synchronizer assemblies includes a fourth synchronizer assembly for selectively connecting the second gear of the fourth gear set to the first countershaft to establish a third gear ratio.

21. The transmission of claim 1 further comprising a first countershaft transfer gear fixed to the first countershaft for common rotation with the first countershaft and a second countershaft transfer gear fixed to the second countershaft for common rotation with the second countershaft and wherein the first and second countershaft transfer gears transfer torque from at least one of the first and second countershafts to the output member.

22. The transmission of claim 21 wherein the output member is a gear that meshes with the each of the first and second countershaft transfer gears.

23. A transmission comprising:
a transmission housing;
a dual clutch assembly having a clutch housing connectable to a flywheel of an engine, wherein the clutch housing is rotationally supported within the transmission housing by a first ball bearing assembly;
a first, second, third, fourth, and fifth gear set, wherein the first gear set includes a first gear in mesh with a first portion of second gear and a third gear in mesh with a second portion of the second gear, the second gear set includes a first gear in mesh with a second gear and a third gear, the third gear set includes a first gear in mesh with a second gear and a third gear, the fourth gear set includes a first gear in mesh with a second gear, the fifth gear set includes a first gear in mesh with a second gear;
a first transmission input member having a first end portion rotatably supported in the transmission housing by a second ball bearing assembly and a second end portion by a first needle bearing assembly, wherein the first needle bearing assembly is disposed adjacent a second end wall of the transmission housing proximate to the dual clutch assembly, and wherein each of the first gear of the third, fourth and fifth gear set are rotatably fixed for common rotation with the first transmission input member and wherein the second ball bearing assembly is adjacent a first end wall of the transmission housing;
a second transmission input member having a first end portion rotatably supported in the transmission housing by a second needle bearing assembly and a second end portion by a third ball bearing assembly, wherein the second needle bearing assembly is disposed between the second ball bearing assembly and the third ball bearing assembly, and wherein the third ball bearing assembly is axially aligned and concentric with the first needle bearing assembly, wherein each of the first gear of the first and second gear sets are rotatably fixed for common rotation with the second transmission input member and wherein the second transmission input member is concentric with the first transmission input member and at least partially surrounds the first transmission input member;
a first countershaft rotatably supported within the transmission housing by a first and second set of thrust bearings and spaced apart from and parallel with the first and second transmission input members, wherein the third gear of the first gear set, the third gear of the second gear set, the third gear of the third gear set and the second gear of the fourth gear set are each selectively connectable for common rotation with the first countershaft;
a second countershaft rotatably supported within the transmission housing by a third and fourth set of thrust bearings and spaced apart from and parallel with the first and second transmission input members, wherein the second gear of the first gear set and the second gear of the second gear set are each selectively connectable for common rotation with the second countershaft;
four synchronizer assemblies for selectively coupling at least one of the gears of the first, second, third, fourth and fifth gear sets with at least one of the first transmission input member, the second transmission input member, the first countershaft and the second countershaft, and
wherein the selective engagement of dual clutch assembly interconnects the dual clutch housing with at least one of the first and the second transmission input members and the selective engagement of at least one of the four synchronizer assemblies establishes at least one of seven forward speed ratios.

* * * * *